United States Patent
Blackmon et al.

(10) Patent No.: US 6,859,419 B1
(45) Date of Patent: Feb. 22, 2005

(54) LASER-BASED ACOUSTO-OPTIC UPLINK COMMUNICATIONS TECHNIQUE

(75) Inventors: Fletcher A. Blackmon, Forestdale, MA (US); Lynn T. Antonelli, Cranston, RI (US); Lee E. Estes, Mattapoisett, MA (US); Gilbert Fain, East Freetown, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/644,574

(22) Filed: Aug. 18, 2003

(51) Int. Cl.[7] .............................................. H04B 11/00
(52) U.S. Cl. ......................................... 367/134; 367/3
(58) Field of Search ................................. 367/134, 3, 1

(56) References Cited

U.S. PATENT DOCUMENTS 3,153,236 A * 10/1964 Harvey ........................... 367/1

6,320,665 B1 * 11/2001 Ngoi et al. .................. 356/485

FOREIGN PATENT DOCUMENTS

WO    WO91/13373    * 9/1991    ........... G01S/15/88

* cited by examiner

*Primary Examiner*—Daniel Pihulic
(74) *Attorney, Agent, or Firm*—James M. Kasischke; Michael F. Oglo; Jean-Paul A. Nasser

(57) ABSTRACT

An apparatus for enabling acousto-optic communication comprising an in-water platform comprising means for emitting an acoustic signal to an acousto-optic interaction zone, an in-air platform comprising the ability for transmitting a first optical interrogation beam, the ability for receiving a portion of the first interrogation beam and a second laser beam formed from the reflection of the first interrogation beam off of the acousto-optic interaction zone, the ability for measuring and outputting a plurality of optical interferences between the portion of the first interrogation beam and the second reflected beam, and a signal converter receiving as input the plurality of optical interferences and outputting an electrical signal representing the received acoustic telemetry signal at the interrogation point at the air-water interface.

9 Claims, 2 Drawing Sheets

LASER-BASED ACOUSTO-OPTIC UPLINK COMMUNICATIONS TECHNIQUE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

The present invention relates to a method and an apparatus for performing non-contact acousto-optic uplink communications. More specifically, the present invention relates to a method and an apparatus for enabling communication between a submerged platform and an in-air platform via the transmission and reception of acoustic and optical signals.

(2) Description of Related Prior Art

Traditionally, underwater acoustic telemetry involves all in-water hardware to establish an acoustic communication link. No known method of communications from a submerged platform to an in-air platform exists. Conventionally, submerged platforms such as submarines have to surface to transmit their data to an in-air platform or remote site. This procedure can be time consuming and inefficient as compared to a non-contact communications scheme.

What is therefore needed is a technique for facilitating the communication of information from an underwater platform to an above-surface platform without establishing a physical link or line of communication between the two.

SUMMARY OF THE INVENTION

Accordingly, it is an object of the present invention to provide a method and apparatus for performing a non-contact acousto-optic uplink communication.

In accordance with the present invention, an apparatus for enabling acousto-optic communication comprises an in-water platform emitting an acoustic signal to an acousto-optic interaction zone. An in-air platform transmits a first interrogation laser beam, a portion of the first interrogation laser beam and a reflection of the first interrogation laser beam from the acousto-optic interaction zone. The in-air platform measures the differences between the received beams. A plurality of optical interferences between the portion of the first interrogation laser beam and the received second laser beam are provided as output. A signal converter receives the plurality of optical interferences and provides an electrical signal representing the in-water acoustic communication signal.

DESCRIPTION OF THE PREFERRED EMBODIMENT(S)

This invention provides a non-contact laser-based sensor acousto-optic communications uplink capability using the concepts of laser Doppler vibrometry, i.e., optical interrogation of the air-water interface, to detect velocity pertubations which provide information on the signal structure, spectrum and time domain signal of the underwater acoustic waveform.

Figure 1:
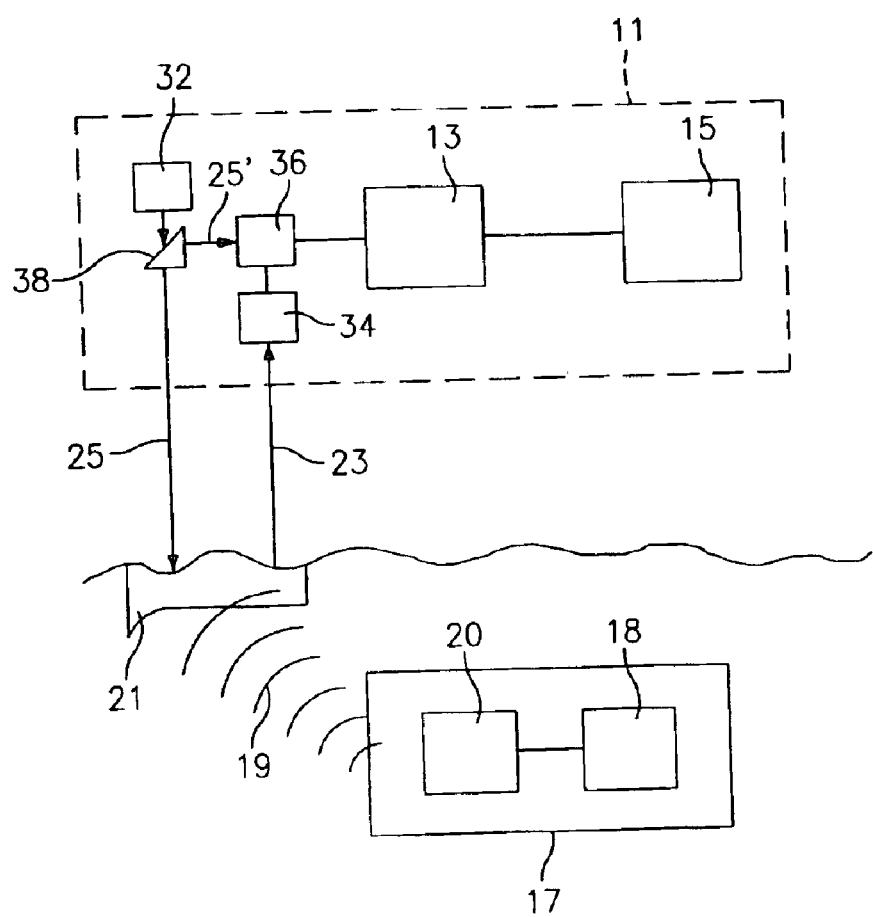
FIG. 1 provides a schematic diagram of the acousto-optic communication system of the present invention.

With reference to FIG. 1 there is illustrated the apparatus of the present invention. In-water platform 17 transmits an acoustic telemetry signal 19 to an acousto-optic interaction zone 21. In a preferred embodiment, in-water platform 17 is a platform such as a submarine fully submerged in a body of water. However, in-water platform 17 may be any platform submerged or partially submerged in water including, but not limited to, sea vessels, submersibles and remote sensing platforms. In a preferred embodiment, the acoustic signal is comprised of a scheme for underwater propagation such as multi-frequency shift keying (MFSK), M-ary phase shift keying (M-PSK), or M-ary quadrature amplitude modulation (M-QAM). In a preferred embodiment, acoustic telemetry signal 19 is provided electrically by a processor 18 to an acoustic projector 20 which projects acoustic telemetry signal 19 into environmental water 31.

Figure 2:
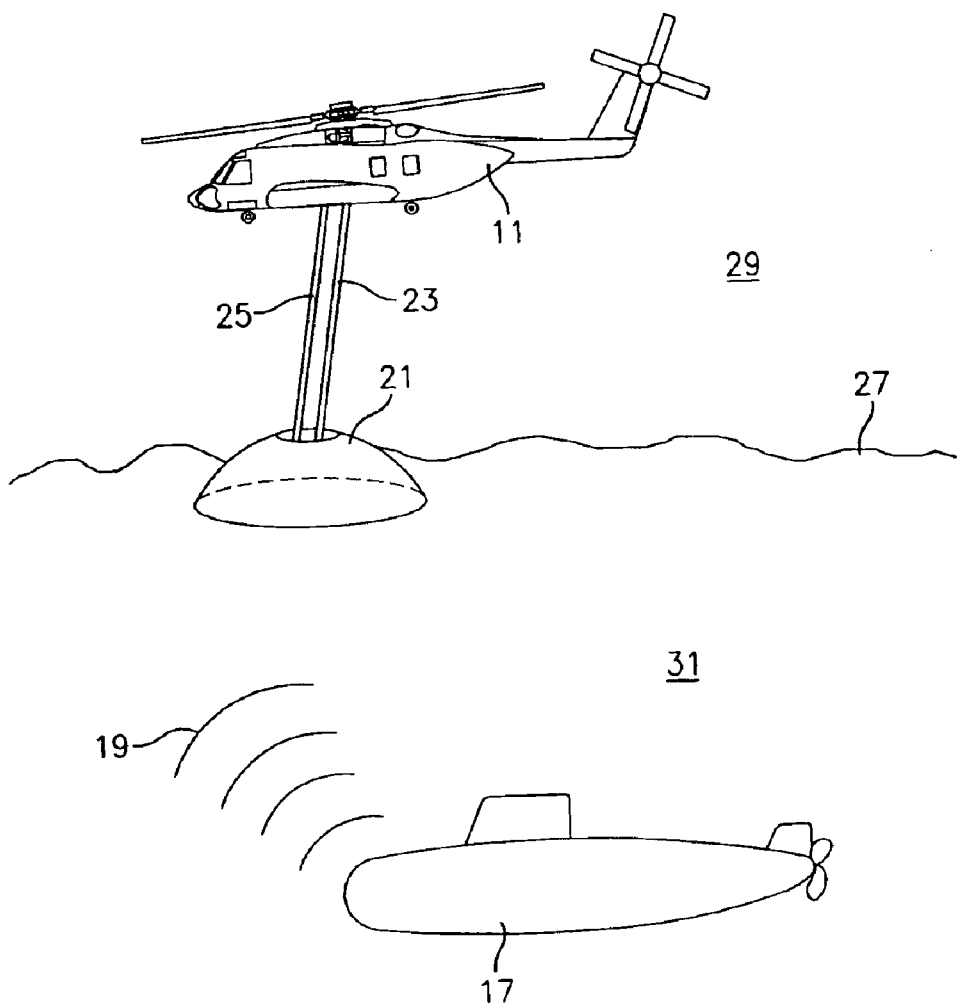
FIG. 2 provides an illustration of the orientation and implementation of the in-air and in-water platforms of the present invention.

Acoustic telemetry signal 19 is emitted from in-water platform 17 towards acousto-optic interaction zone 21. Acousto-optic interaction zone 21 is contiguous to air-water boundary 27. In FIGS. 1 and 2, the air is indicated as 29 and the water as 31. As such, part of acousto-optic interaction zone 21 consists of an area of the surface boundary between the air 29 and the water 31. The interaction of the acoustic telemetry signal 19 with the acousto-optic interaction zone 21 causes physical perturbations in the air-water, pressure release boundary 27. These perturbations take the form of surface vibrations.

In-air platform 11 transmits an optical interrogation laser beam 25 created by a laser 32 towards the acousto-optic interaction zone 21 at a time when the perturbations in the air-water boundary 27 formed at the acousto-optic interaction zone 21 are expected. In a preferred embodiment, in-air platform 11 is a rotary winged aircraft capable of hovering over and in proximity to acousto-optic interaction zone 21 as illustrated in FIG. 2. While described in relation to a helicopter, the present invention is not so limited. Rather, the in-air platform of the present invention is broadly drawn to include any platform located above the air-water boundary capable of emitting an interrogation beam 25 including, but not limited to, fixed wing aircraft, satellites, land based systems, and portions of a sea vessel located above water.

The interrogation beam 25 is reflected off the air-water boundary 27 and back to in-air platform 11 for reception as a received reflection beam 23. Although, in the preferred embodiment, interrogation beam 25 and reflection beam 23 are transmitted and received at the same platform, different platforms could be used for transmitting and receiving. Having been formed from a reflection off of a surface experiencing vibrational perturbations, received reflection beam 23 is laser light altered to include numerous frequency shifts corresponding to the vibrational perturbations of the acousto-optic interaction zone 21.

Analysis of the received reflection beam 23 may be performed to recover acoustic telemetry signal 19 using the invention as claimed hereinafter. Laser Doppler vibrometry refers to optical interrogations of the pressure release interface and layers slightly below the surface to detect velocity perturbations. A laser doppler vibrometer 36 is joined to single sensor or a number of sensors 34 arranged to obtain beam formable array data. A splitter 38 is used to divide out unperturbed portion of the interrogation beam 25' from the interrogation beam 25. The unperturbed beam portion 25' is used as a reference to compare with received reflected beam 23. As noted above, received reflection beam 23 is perturbed by the vibrations in the air-water boundary 27 in contact with acousto-optic interaction zone 21. The optical interference between the two beams 23, 25 are measured as a Doppler velocity by an interference vibrometer 36, which is then converted to an electrical representation of the acoustic signal in the form of an electrical signal by acoustic/photonic/electrical signal converter 13. Acoustic/photonic/electrical signal converter 13 outputs the electrical signal to a telemetry receiver 15. Telemetry receiver demodulates or otherwise decodes the electrical signal to recreate the received acoustic telemetry signal at the air-water interface.

Because the perturbations to the acousto-optic interaction zone 21 occur over a finite time and space, advance knowledge of the time and place to emit and receive optical interrogation beams is generally required by the in-air platform 11. This required knowledge adds a layer of data transmission security, preventing unwanted parties from accessing the acoustic telemetry signals 19. In addition, the sensing capability of the present invention can be used for a number of related applications such as threat/marine mammal detection.

It is apparent that there has been provided in accordance with the present invention an apparatus for performing a non-contact acousto-optic uplink communications which fully satisfies the objects, means, and advantages set forth previously herein. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. An apparatus for enabling acousto-optic communication from water to air comprising:
   an acoustic projector positionable below a surface of the water;
   an optical interrogation beam transmitter to transmit an interrogation beam from the air toward the surface of the water;
   an optical interrogation beam receiver to receive a reflection of the interrogation beam from the surface of the water;
   an interferometer joined to said optical interrogation beam transmitter and said optical interrogation beam receiver to measure differences between said interrogation beam and said reflection of the interrogation beam;
   a signal converter joined to said interferometer to receive said measured differences and provide an electrical signal corresponding to said measured differences; and
   a signal processor joined to said acoustic projector to provide a signal to the acoustic projector.

2. The apparatus of claim 1 wherein said optical interrogation beam transmitter is a laser.

3. The apparatus of claim 2 further comprising a beam splitter joined in communication with said optical interrogation beam transmitter and said interferometer, said beam splitter splitting off a portion of said interrogation beam to provide to said interferometer.

4. The apparatus of claim 3 wherein said interferometer is a laser Doppler vibrometer.

5. The apparatus of claim 1 wherein said signal is translated into a scheme selected from the group consisting of multi-frequency shift keying, M-ary phase shift keying, and M-ary quadrature amplitude modulation.

6. The apparatus of claim 5 further comprising a telemetry receiver joined to said signal converter to receive the electrical signal and translate the electrical signal back into the original signal.

7. A method for transferring a signal from below a water surface to air above the surface comprising the steps of:
   transmitting an acoustic signal below the water surface to an acousto-optic interaction zone;
   transmitting an optical interrogation beam from the air to the acousto-optic interaction zone;
   receiving a reflection of said optical interrogation beam from the acousto-optic interaction zone;
   comparing said transmitted optical interrogation beam with said reflection to obtain interferences;
   converting said interferences into an electrical signal;
   providing a signal of interest below the surface prior to said step of transmitting;
   modulating said provided signal with one modulation selected from a group consisting of multi-frequency, shift keying, M-ary phase shift keying, and M-ary quadrature amplitude modulation; and
   providing said modulated signal as said acoustic signal.

8. The method of claim 7 further comprising the step of demodulating said electrical signal to restore said signal of interest above the surface.

9. The method of claim 7 further comprising the step of splitting said transmitted optical interrogation beam into a first optical interrogation beam transmitted from the air to the acousto-optic interaction zone and a second optical interrogation beam provided as said transmitted optical interrogation beam for said step of comparing.

* * * * *